Figure 6:
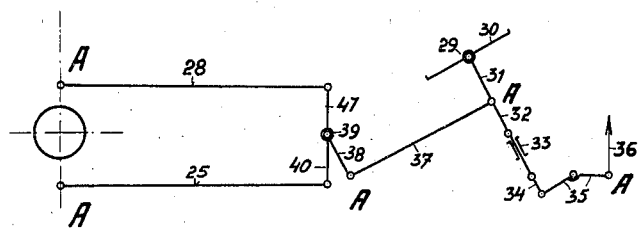

May 29, 1934.    B. KACER ET AL    1,960,414
CONTROL DEVICE FOR MOTOR VEHICLES
Filed Aug. 4, 1932    3 Sheets-Sheet 1
FIG. 1.
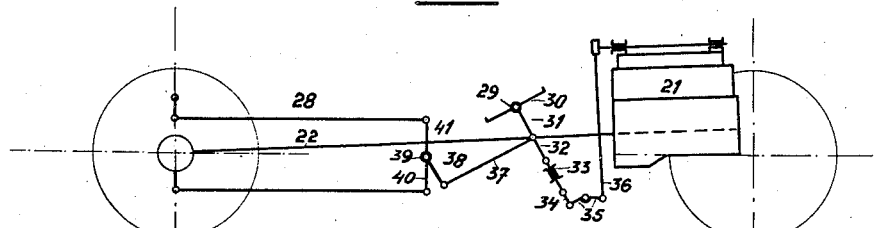
FIG. 2.
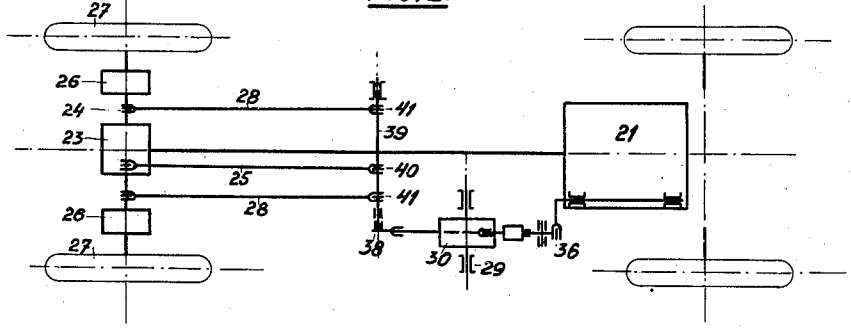
FIG. 3.     FIG. 4.     FIG. 5.
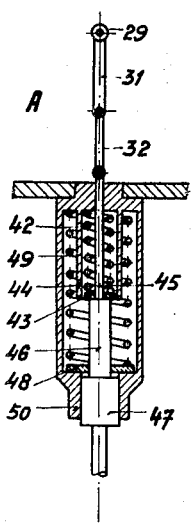 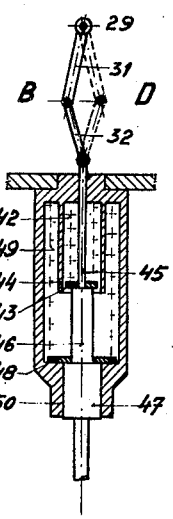 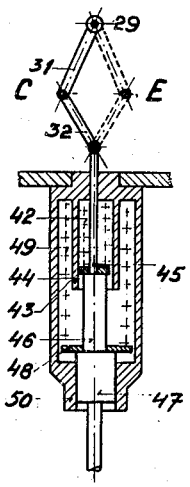

May 29, 1934.　　　B. KACER ET AL　　　1,960,414
CONTROL DEVICE FOR MOTOR VEHICLES
Filed Aug. 4, 1932　　　3 Sheets-Sheet 2

May 29, 1934.　　　　B. KACER ET AL　　　　1,960,414
CONTROL DEVICE FOR MOTOR VEHICLES
Filed Aug. 4, 1932　　　3 Sheets-Sheet 3
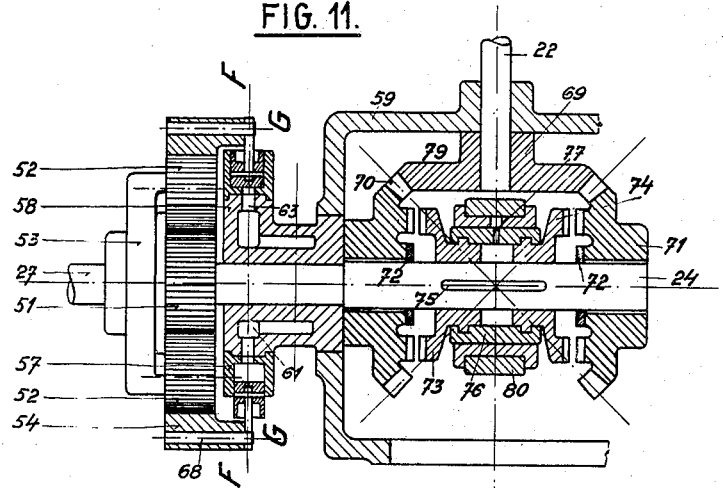
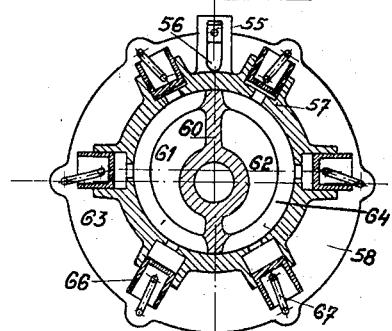
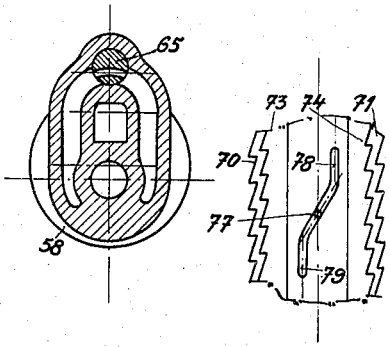
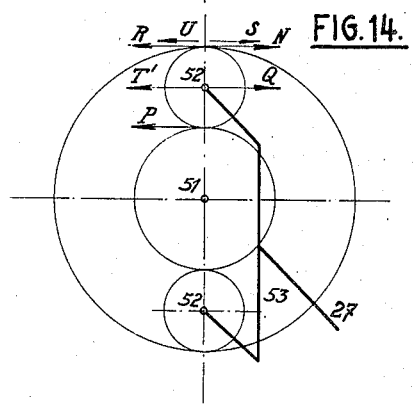
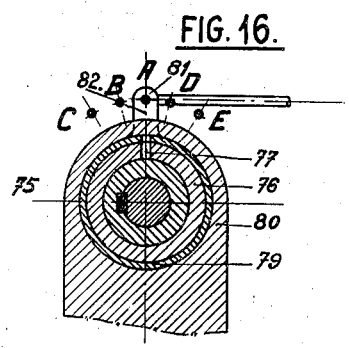

Patented May 29, 1934

1,960,414

UNITED STATES PATENT OFFICE 1,960,414

CONTROL DEVICE FOR MOTOR VEHICLES

Bohuslav Kacer and Max Nohel, Prague, Czechoslovakia

Application August 4, 1932, Serial No. 627,520
In Czechoslovakia August 3, 1931

6 Claims. (Cl. 192—.01)

This invention relates to a single lever control for motor car gears.

Motor car gears are at present controlled by a number of levers which differ in arrangement and operation according to the type of car concerned. These levers whose operation makes it necessary for the driver to take one hand off from the steering wheel serve for controlling devices which are of sensitive construction and therefore subjected to relatively rapid wear. Since accidents and service troubles are frequently due to these conditions, devices have been proposed which partly provide for simpler operation of the control means and partly employ automatic means.

According to the present invention, all control devices are coupled with the gas lever for the purpose of effecting complete control of the drive of a motor car without the use of clutches, variable speed gears and differential while insuring a steady transition from one operation to another. The lever has preferably two arms and is disposed so as to be capable of moving on either side about a central position, the forward and backward strokes of the lever corresponding, respectively, to the forward and reverse movement of the vehicle. The main feature of the invention is that by moving a single lever forward or backward from its central position and by adjusting the rods connected with this lever the direction of motion of the vehicle will be changed by the engagement of a reverse gear, such as a double-sided cog-coupling, the fuel supply increased by the adjustment of the engine control during further motion of the lever in the same direction and the regulating member of a sliding clutch for transmitting the engine output to the driving wheels positively adjusted.

The regulating member of the sliding clutch is constructed so that its position is determined on the one hand by adjustment from the control lever and, on the other, by its automatic elastic adjustment dependent on the resistance to motion.

The adjustable sliding clutch is characterized by the connection of a planet gear with an arrangement, that allows the rotary movement of the rim of the planet gear to be influenced in order to change the speed of the vehicle.

The description relates to an adjustable sliding clutch, consisting of a planet gear whose rim is connected with a piston-pump system. The rotary motion of this pump system, caused by the central wheel of the planet gear is influenced by a regulating member inserted in the connection pipe between the pressure space and suction space of the pump system.

The regulating member of the sliding coupling, owing to its connection with the control lever, adjusts, dependent on the engine output, as resistance at the circumference of the planet gear rim the force at periphery required for transmitting the engine output to the driving wheels of the vehicle. The difference between the peripheral force at the rim adjusted in this manner and the circumferential force actually produced by resistance to motion serves for the automatic correction of the mechanical adjustment of the regulating member from the control lever and thus for establishing the gearing required with respect to engine output and resistance to motion.

In case of a hydraulic throttle valve an increase of peripheral force at the planet gear rim will result in higher velocity of the liquid in the cross section of the throttle and thus in higher gearing. If the rotary speed is influenced by an adjustable pump system the performance thereof is mechanically adjusted from the control lever in dependence on the engine output, the adjustment being automatically corrected, for instance, against spring pressure, corresponding to the liquid pressure produced in the pump system by the resistance to motion to adjust the requisite gearing.

By providing a regulatable sliding coupling of this type for each driving wheel of the vehicle automatic gearing down will be effected in bends of the road with respect to the wheel on the inside of the curve corresponding to the resistance to motion, and, vice versa, gearing up will take place automatically with respect to the wheel on the outside of the curve corresponding to the lower resistance to motion, so that compensation is brought about without the use of a special differential gear.

Since the shifting motion of the lever is steady and the direction of motion is reversed always at minimum engine speed, it is possible to throw in the reverse without shocks even when driving downhill to retard the motion of the vehicle and then, by means of the finely adjustable engine work, to effect elastic and sure braking.

Figure 7:
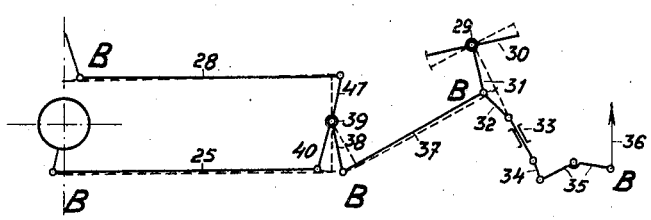
Figure 8:
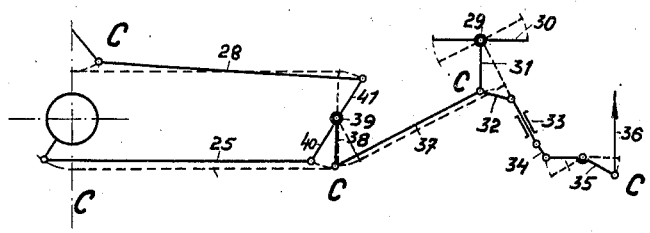
Figure 9:
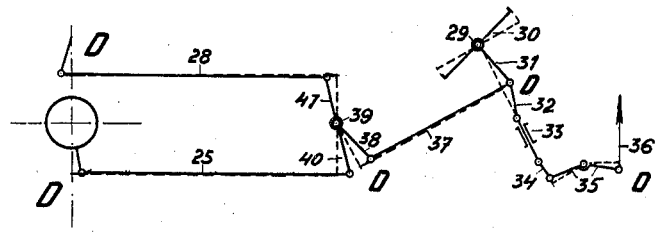
Figure 10:
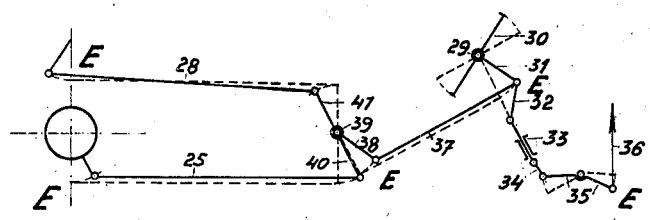

One form of the invention is illustrated in the accompanying drawings, in which Figure 1 is a side view of the arrangement of the rods in the vehicle; Fig. 2, a plan thereof; Fig. 3 shows the fixing device for the rods in center position; Fig. 4 shows the same after the reverse gear has been thrown in, i. e., in the beginning of the engine engagement; Fig. 5 shows the same at the limiting output of the engine; Fig. 6 is a view of the rods in center position; Fig. 7, a view thereof after forward speed has been thrown in; Fig. 8, a view thereof during full-load output of the engine for forward motion; Fig. 9, a view thereof after the reverse gear has been thrown in; Fig. 10, a view thereof during full load output of the engine for reversing; Fig. 11 is a horizontal section of the rear wheel axle carrying the reverse gear and two planet gears in connection with a hydraulic brake to serve as sliding coupling; Fig. 12 is a section of the pump system of the brake on the plane F—F, of Fig. 11; Fig. 13 is a cross section of the regulating member of the hydraulic brake on the plane G—G, of Fig. 11; Fig. 14 is a diagram to explain the automatic speed adjustment in the planet gears; Fig. 15 shows the development of the cylinder surface of a claw coupling; and Fig. 16 is a cross section of the reverse gear.

The explanation of the automatic speed adjustment with respect to the planet gears mentioned above and the hydraulic brake applies, with the necessary modifications, to any other system of adjustable sliding or slowly engaging couplings.

Referring to the drawings, the engine 21 drives the reverse gear 23 disposed on the shaft 24 by means of the shaft 22, the mechanism of the gear being adjusted by the rod 25. From the shaft 24 the motion is transmitted through the sliding couplings 26 to the driving wheels 27 of the vehicle, and the regulating members of the couplings are adjusted by means of the draw bars 28.

On the axis 29 arranged in the vehicle rotates the control lever 30 whose motion is transmitted from the lever arm 31 over the rod 32, the fixing device 33, the rod 34 and the double-armed lever 35 to the rod 36 and the engine control as well as by the rod 37 to the lever arm 38 which is keyed onto the axis 39 arranged in the vehicle. From the axis 39 the motion is transmitted by the arm 40 and the draw bar 25 to the mechanism of the reverse gear and, by means of the arm 41 and the draw bars 28, to the regulating members of the sliding couplings.

When the control lever 30 is in center position, the mechanism of the reverse gear 23 which transmits the motion to the shaft 24 is disengaged and the engine runs light. As shown in Fig. 3, a compression spring 42 correspondingly tensioned presses against a disc 43 inserted in the inner sleeve 44 and resting on the projection 45 of the bar 46, and thus holds the rods in position.

To move the lever 30 forward the resistance of the spring 42 must be overcome until all points A, of Fig. 6, are brought into the position B shown in Fig. 7. When in this position the draw bar 46 will rest with its shoulder 47 on the disc 48, as indicated in Fig. 4, against which disc a spring 49 having initial tension bears which has been inserted in the outer sleeve 50 of the adjusting device. By this motion the engine control gear will be brought into the position of engagement. By means of the draw bar 25 the reverse gear has been thrown in for forward motion in the meantime, and the bars have placed the regulating member of the sliding couplings in operative position.

When the lever 30 is moved further to the front, the motion of the bar 46 against the action of the springs 42 and 49 will increase the gas supply and thus increase the engine output; the draw bars 28 will adjust the sliding couplings to the transmission of the amount of peripheral force corresponding to the engine output just adjusted; and the reverse gear, by means of the bar 25, will be kept in position for forward motion until in the position C of the rods, as shown in Fig. 8, the limiting output of the engine for forward motion is adjusted.

When the lever 30 overcomes the resistance of the spring 42 and is turned back, the points A, Fig. 6, will be in the position D, Fig. 9, while the bar 25 throws in the reverse gear, the bars 28 adjust the regulating member of the sliding coupling and the bar 46 adjusts the engine control gear to initial engagement until it will be seated with the shoulder 47 on the disc 48 held by the spring 49.

During further reverse motion of the lever 30 the engine output will be increased by the motion of the bar 46 against the action of the springs 42 and 49; the bars 28 will adjust the slow acting or sliding couplings to the transmission of the peripheral force corresponding to the engine output as adjusted; and the bar 25 will hold the mechanism of the reverse gear in the position for reversing until in the position E, Fig. 10, the full load output of the engine for reversing has been adjusted.

The sliding or slow acting coupling is shown in Figs. 11, 12 and 13. The shaft 24 driven in either direction by the reverse gear 23 carries at each end a planet gear consisting of the sun gear 51 keyed onto the shaft 24 and engaged by the satellites 52 which are disposed freely rotatably on a pin inserted in the cross arm 53 and transmitting the motion to the driving wheels 27. The satellites 52 engage the planet gear rim 54 which, with its continuation 55, engages a groove 56 of the eccentric ring 57 which thus cooperates in the motion of the rim 54 about the eccentric 58 firmly arranged in the casing 59 and forming a bearing for the shaft 24. The eccentric 58 is divided by a partition 60 into two chambers 61 and 62 which are connected with the surface of the eccentric on which the eccentric ring 57 rotates by the grooves 63 and 64.

As shown in Figs. 11 and 13, a throttle slide 65 is laterally disposed between the chambers 61 and 62 in such a way that when the rods are in the positions between B, in Fig. 7, and D, in Fig. 9, the passage is left free while during further motion of the lever the passage area is reduced.

In the eccentric ring several pistons 66 are arranged which are suspended from the pins 68 of the planet gear rim 54 by means of the rods 67.

As long as the engine 21 runs light, the throttle slide 65 will be open and during transmission of the motion the planet gear rim 54 will be driven by the satellites 52 at the same circumferential speed but in a direction opposite to that of the sun gear. The pumps 66 draw liquid out of one chamber and press the liquid with which the system is filled into the other chamber without any resistance on the part of the throttle slide 65.

If the lever 30 is operated to adjust a certain engine output characterized by the engine speed $n$ and the peripheral force P of the sun gears, Fig. 14, the rods 28 coupled with the lever 30 will simultaneously adjust the regulating cock 65 so that a throttle resistance R is produced which is just equal to the peripheral force N which, as a reaction of P, would turn back the planet gear rim 54.

By holding the planet gear rim 54 in position the driving moment is transmitted in the usual way to the driving wheels at a speed $n1$.

On the other hand, if the resistance to motion increases, the reaction Q of the difference between resistance to motion and engine output will appear at the planet gear rim as component S which will move the rim, which has been stationary owing to R=N, against the resistance of the throttle slide in a direction opposite to that of the sun gear. The speed of the arm 53 will thus be reduced and the number of revolutions $n_2$ will be smaller than $n_1$, so that the gearing $n:n_2$ will be higher and the speed of the vehicle reduced. Reversely, if the resistance to motion is smaller, the reaction between engine output and resistance to motion T will appear at the planet gear rim in the form of the component U which acts like the resistance R of the throttle slide and causes the rim to be driven in the same direction as the sun gear whereby the speed of the arm 53 will be accelerated, the gearing brought to $n:n_3$ and the speed of the vehicle increased.

When curves of the road are negotiated, each individual wheel will adjust the necessary gearing independently from the others as required, gearing down being effected with respect to the wheel on the inside of the curve, corresponding to the greater resistance to motion, and gearing up with respect to the wheel on the outer side, corresponding to the lower resistance, and a special differential may be dispensed with.

The reverse gear as shown in Figs. 11, 15 and 16 consists of the bevel wheel 69 keyed onto the engine shaft 22 and of the bevel wheels 70 and 71 in mesh with the wheels 69 and freely rotatable on the shaft 24. The bevel wheels 70 and 71 are axially secured by the adjusting rings 72 and provided with internal gearing, as indicated in Fig. 15, which is engaged by the two halves 73 and 74 of a claw coupling, which are disposed on the shaft 24 and displaceable along the splines 75 and arranged in grooves of the sleeve 76. The axial position of this sleeve is fixed by the pin 77 firmly inserted therein which moves in the groove 78 of the sleeve 79 arranged in the bearing 80 connected with the casing 59. The sleeve 76 is adjusted by the rod 25 which engages the arm 82 of the sleeve 79 at 81 so that at a deflection of the lever from central position towards either side of the bevel wheel 70 will be engaged by the half member 73 or the wheel 71 by the half member 74 and, during further deflection, the coupling will be held in the position attained.

By arranging the rods so that the direction of motion of the vehicle is controlled when the engine is running light on the pilot jet and with open throttle slide 65, it is possible in view of the slow acting couplings to throw in the reverse also during forward motion at constant transition from the original output via the idling position without running the risk of stopping the engine or causing harmful shocks.

We claim:

1. A single lever control device for the drive of motor vehicles, comprising a control lever, a reverse gear, an operating member for the said reverse gear, rods connecting the said operating member of the reverse gear with the said control lever, slow acting couplings for each of the vehicle wheels to be driven, the said couplings being connected with the said reverse gear, a regulating member for the said slow acting couplings, transmitting members connecting the said regulating member with the said control lever, a regulating member for the fuel supply to the engine, and transmitting rods connecting the said fuel supply regulating member with the said control lever, the said regulating member for the fuel supply, the said operating member for the reverse gear and the regulating member for the slow acting couplings being connected with the said control lever in such a way that during the reversal of the said control lever for forward and backward motion the said rods for the fuel supply regulating member and the said transmitting members for the regulating member of the slow acting couplings are operated in the same direction while the rods for the said operating member of the reverse gear are operated according to the direction of driving.

2. A single lever control device according to claim 1, in which a special regulating member is provided for the slow acting couplings of each vehicle wheel, the said regulating member being connected by special rods with the control lever.

3. A single lever control device according to claim 1, in which the slow acting couplings are constructed as hydraulic couplings.

4. A single lever control device according to claim 1, in which a planet gear is interposed between the slow acting couplings and the vehicle wheels, the sun gear of which is connected with the reverse gear while the rotary planet gears are rigidly connected with the axis of the vehicle wheels and the rim of the said planet gear is braked by the slow acting couplings.

5. A single lever control device according to claim 1, in which the control lever is influenced by several springs adapted to act successively to make the positions of the regulating members of the control device dependent upon the beginning of the action of the said springs.

6. A single lever control device according to claim 1, in which the control lever is influenced by two springs adapted to act successively so as to cause operation of the reverse gear and of the slow acting couplings at the same time when the first spring action is overcome and the operation of the regulating member for the fuel supply when the second spring action takes place.

BOHUSLAV KACER.
MAX NOHEL.